United States Patent [19]
Zell

[11] Patent Number: 5,697,259
[45] Date of Patent: Dec. 16, 1997

[54] COMMUNICATION SYSTEM HAVING A SELF-SUPPORTING WIRING BACKPLANE

[75] Inventor: Karl Zell, Niederpoecking, Germany

[73] Assignee: Siemens Aktiengesellschaft, Munich, Germany

[21] Appl. No.: 567,485

[22] Filed: Dec. 5, 1995

[30] Foreign Application Priority Data

Dec. 27, 1994 [DE] Germany ............................. 9420759 U

[51] Int. Cl.⁶ .................................................... F16C 1/10
[52] U.S. Cl. ........................ 74/500.5; 361/829; 379/327
[58] Field of Search ........................... 74/500.5, 501.5 R; 361/823, 624, 826, 829; 439/51, 571

[56] References Cited

U.S. PATENT DOCUMENTS

| 2,328,724 | 9/1943 | Johnson et al. | 379/327 |
| 3,349,291 | 10/1967 | Olashaw | 361/624 |
| 3,376,542 | 4/1968 | Vlaminck | 439/571 |
| 3,418,621 | 12/1968 | Campbell | 439/51 |
| 3,521,129 | 7/1970 | MacKenzie | 361/829 |
| 3,780,351 | 12/1973 | Salmon et al. | 361/829 |
| 3,784,728 | 1/1974 | De Bortoli et al. | 174/60 |
| 3,831,128 | 8/1974 | Paluch | 439/142 |
| 3,904,936 | 9/1975 | Hamrick et al. | 361/826 |
| 4,675,900 | 6/1987 | Temkin | 379/327 |
| 4,958,262 | 9/1990 | Wilkie | 361/823 |

Primary Examiner—Vinh T. Luong
Attorney, Agent, or Firm—Hill, Steadman & Simpson

[57] ABSTRACT

A communication system including a switching system and a main distributor connected thereto via internal central office lines for the connection of the subscriber network lines is provided. To provide a simple and cost-beneficial communication system, a self-supporting wiring backplane is used having an upper end where the individual system assemblies of the switching system can be hooked and plugged by a downward swivel connection. The terminal strips (splitting strips) of the internal side of the main distributor have exchange-side terminals pressed in on the same wiring backplane under the system assemblies.

5 Claims, 1 Drawing Sheet

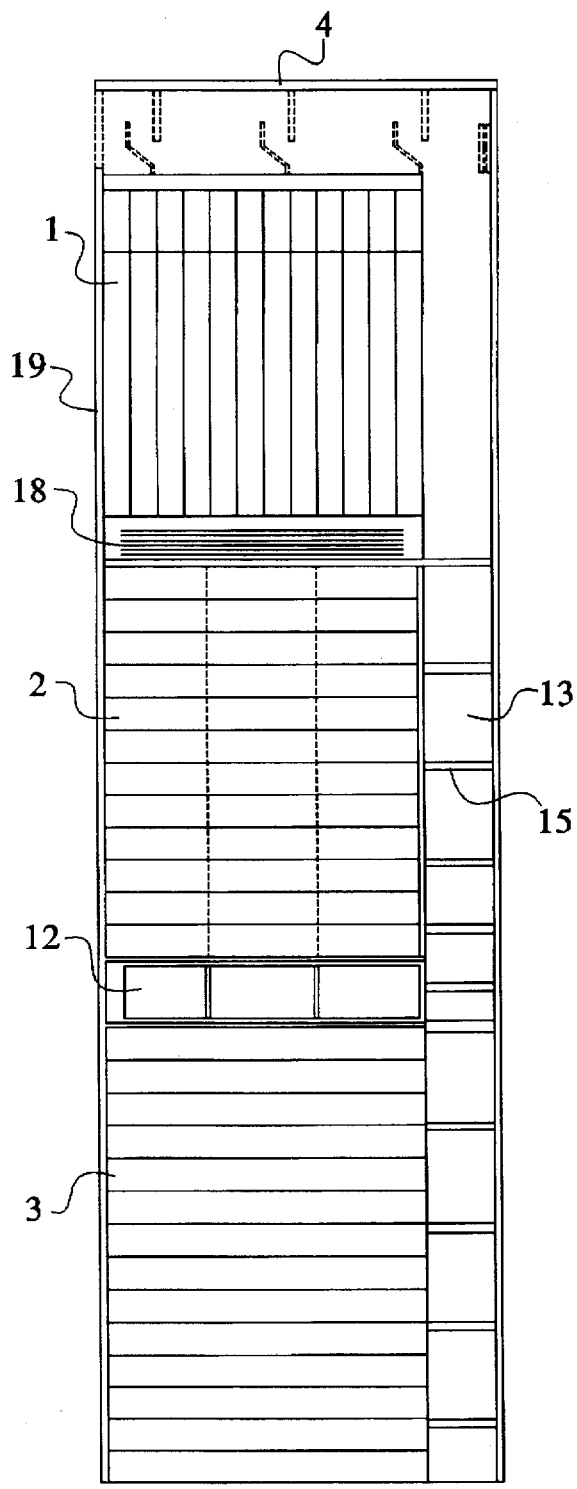
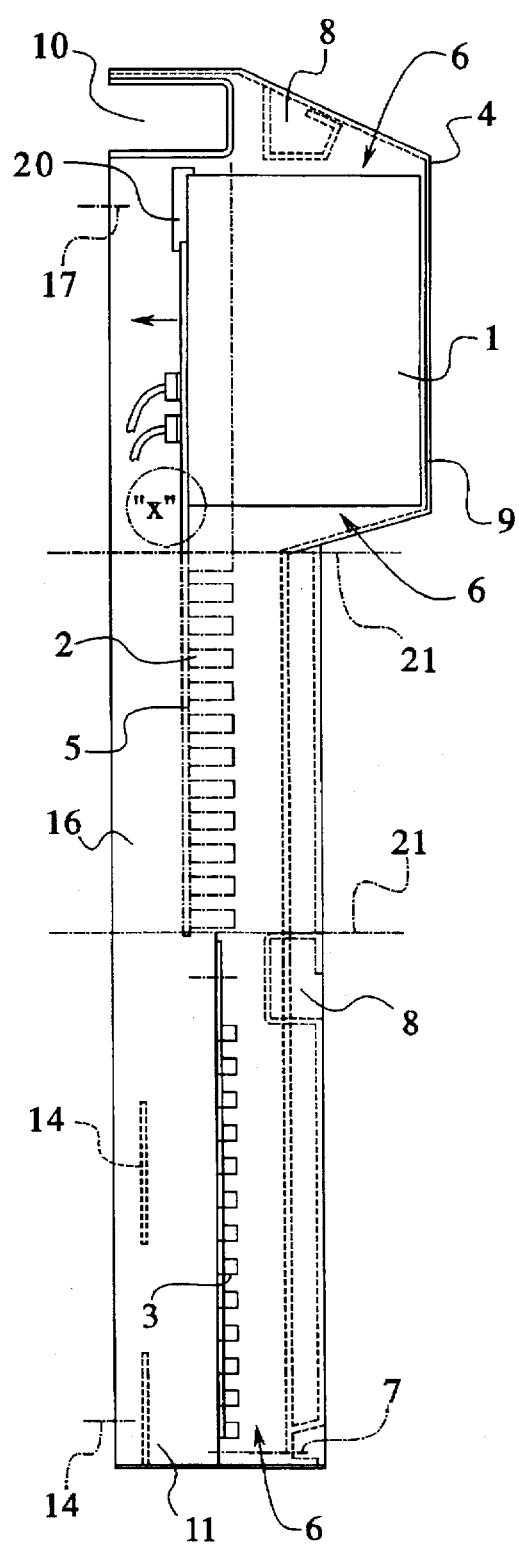

COMMUNICATION SYSTEM HAVING A SELF-SUPPORTING WIRING BACKPLANE

BACKGROUND OF THE INVENTION

1. Field of the Invention

The present invention is directed to a communication system composed of a switching system and a main distributor connected thereto via internal central office lines for the connection of the subscriber network lines.

2. Description of the Related Art

Up to now, communication systems have been separately constructed of a switching system and a main distributor. Respectively separate, spatially separated housing designs are thereby implemented as floor and/or wall versions. The electrical connection to one another is made with a plurality of shielded and costly HVT patch cables that must be laid in specific cable channels. The space requirement and the assembly outlay on the floor or, respectively, at the wall is substantial, as is the specific length definition of the patch cables coupled thereto (fabrication, mounting/service logistics, expenses, packaging, etc.).

Switching systems are currently accommodated in housing or cabinet structures. The individual switching assemblies are thereby managed as open pc board assemblies in a complicated module frame structure and are connected to one another with a wiring backplane. At the back side of the wiring backplane or, respectively, at the front side of the assemblies, the subscriber lines are conducted via cable plugs and cables to an externally arranged main distributor (HVT) in a separate housing structure. For electrical reasons (EMF), shielded patch cables are usually used. The shield of the patch cables must be manually stripped upon exit from or entry into the housing to be shielded. Then, the patch cables must be electrically connected to this housing. At the internal side of the main distributor, subscriber lines are placed onto the terminal posts of distribution strips and are electrically contacted. In the cable plug and at the distributor strips, the cable cladding must be stripped, the lead bundles uncovered and the individual leads must be stripped and connected. These manufacturing and assembly processes are especially time consuming and costly.

SUMMARY OF THE INVENTION

It is an object of the present invention to provide a communication system of the species initially cited that can be more simply and inexpensively manufactured as well as easier to assemble.

This object is achieved in a communication system of the species initially cited having a self-supporting wiring backplane in a housing structure. At the upper end of the housing structure, the individual assemblies of the switching system can be hooked via a hinge means and can be downwardly plugged with a swivel connection. The terminal strips (splitting strips) of the internal side of the main distributor are pressed into the wiring backplane below the system assemblies on the same backplane. The terminal strips (strapping connectors) of the external side of the main distributor are engaged into the housing structure of the wiring backplane below the internal side of the main distributor. The internal side of the main distributor is separated from the external side of the main distributor by a carrier for special inserts secured to the housing structure of the wiring backplane. The strapping between the internal and external side of the main distributor occurs via patching wires in corresponding wire guides and patching regions that are formed by self-threading channels and patching hooks.

In the inventive communication system, the switching system and the main distributor form a unit. Alternatively, the switching system is a component part of the internal side of the distributor from a structural point of view. In the communication system of the present invention, the internal patch cables between the switching system and the internal side of the main distributor can be eliminated. The structure of the actual switching system is simplified since the complicated module frame that has been standard is replaced by a simply constructed assembly holder that is formed by the self-supporting wiring backplane.

In an embodiment of the present invention, the wiring backplane is planar with its housing structure. This wiring backplane is stiffened and mechanically protected such that only the plug-in slots are freely accessible. Thus, the hinge function is integrated. An especially simple, stable and protected structure of the wiring backplane is thereby provided.

Other embodiments of the inventive communication system include encapsulating the individual assemblies of the switching system by a perforated or, respectively, unperforated plastic cladding or sheet metal cladding. The assemblies are thus protected against contacting and heating. The required EMF conditions can also be met. In this way, the individual assemblies of the actual switching system can therefore be individually marketed well-protected and inserted into the correspondingly provided plug-in locations by the customer.

In order to be able to easily undertake subsequent modifications and adaptations, the wiring backplane with its housing structure is multi-piece, wherein the individual parts are allocated to the switching system and/or one of the two sides of the main distributor. A modular separation in the backplane region of the switching system and the main distributor or, respectively, main distributor sides is thereby achieved.

An exemplary embodiment of a communication system of the present invention is described below with reference to the drawings.

BRIEF DESCRIPTION OF THE DRAWINGS

FIG. 1 is a longitudinal section through an exemplary embodiment of a communication system according to the present invention.

FIG. 2 is a plan view onto the individual assemblies and components of the communication system of the present invention shown in FIG. 1.

DETAILED DESCRIPTION OF THE PREFERRED EMBODIMENTS

The inventive communication system is essentially composed of three units, namely an actual switching system 1, an internal side 2 of the main distributor and an external side 3 of the main distributor. The three units are arranged spatially under one another. In the communication system of the present invention, the switching system 1 and the internal side 2 of the main distributor are connected to one another via a wiring backplane 5, wherein the wiring backplane 5 is embedded in a housing structure. The housing structure is thereby implemented such that it also extends over the entire communication system.

The wiring backplane 5 together with its housing structure serves the purpose of wiring the modules of the switching system to one another as well as connecting the switching system to the exchange-side terminals of the internal side 2 of the main distributor. This wiring backplane 5 is planar, as well as being stiffened and mechanically protected such that only the plug-in locations are freely accessible. Thus, the hinge function for hooking and swivelling the individual switching assemblies is integrated in the wiring backplane. The wiring backplane 5 and its extension can be one piece. However, it is also possible to separately attach the lengthened part of the wiring backplane to the actual system wiring backplane. This can occur directly with pressin blades in a multiboard technique or with a direct plug or can occur via a plug-type connector. The connection of the actual system wiring backplane to the extension can occur via different types of plugs, i.e. plugs from different manufacturers.

A division possibility of the wiring backplane 5 and its housing structure can also be provided between the internal side and the external side of the main distributor. Two modular parting locations 21 thus derive.

In the inventive communication system, thus, the switching system 1 is integrated into the internal side of the main distributor or, respectively, is a component part of the internal side 2 of the main distributor from a structural point of view. Internal patch cables between the switching system 1 and the main distributor can thus be eliminated.

As shown in FIG. 2, the external side 3 of the main distributor is arranged under the internal side 2 of the main distributor, separated by a carrier 12 for special inserts. Cable entry 11 (see FIG. 1) of the line network is under the external side 3 of the main distributor. Also, the individual cables are conducted onto webs 14 for the line network. The shield contacting also is at the webs 14. The strapping between the internal side 2 of the main distributor and the external side 3 of the main distributor uses strapping cables that are guided by a right-hand strapping channel 13 and by non-threading strapping hooks 15.

The actual switching system is encapsulated by a cladding 4 having a potentially required shielding function. Aeration slots 6 are provided for eliminating the dissipated electrical power, and a fine protection 18 is provided if necessary.

As illustrated in FIG. 2, individual switching assemblies 19 of the switching system 1 are encapsulated by a perforated or, respectively, unperforated plastic cladding or sheet metal cladding. The assemblies 19 can thus be protected against contacting and heating. The required EMF conditions can also be met. Since the individual assemblies 19 are merely hooked in the upper end region of the wiring backplane 5 and are then swivelled down in order to be plugged, the individual assemblies 19 of the actual switching system 1 can therefore be individually marketed well-protected and inserted into the correspondingly provided plug-in locations by the customer.

The entire communication system is secured to a frame 16 that is in turn secured to a wall with wall fasteners 17.

Continuous grip shells 8 are provided for optimizing the assembly and service conditions. In addition, the entire communication system can be protected against unauthorized interventions by a lock 7.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A communication system having a switching system and a main distributor, the main distributor having an internal side and an external side, the main distributor connected to the switching system via internal central office lines for the connection of the subscriber network lines, comprising:

a housing structure having a self-supporting wiring backplane, the housing structure having an upper end;

the switching system having system assemblies that are hookable to the upper end and that are downwardly pluggable with a swivel movement about the upper end;

the internal side of the main distributor having terminal straps that are pressed into the wiring backplane below the system assemblies on the wiring backplane;

the external side of the main distributor having terminal straps that engage into the housing structure of the wiring backplane below the internal side of the main distributor, the internal side of the main distributor being separated from the external side of the main distributor by a carrier for inserts secured to the housing structure of the wiring backplane, and the internal side and external side of the main distributor being connected via strapping cables in regions having channels and non-threading strapping hooks.

2. The communication system according to claim 1, wherein the wiring backplane is planar with the housing structure and is stiffened and mechanically protected such that only plugin locations for the system assemblies are freely accessible.

3. The communication system according to claim 1, wherein each assembly is encapsulated in a plastic cladding.

4. The communication system according to claim 1, wherein each system assembly is encapsulated in a sheet metal cladding.

5. The communication system according to claim 1, wherein the wiring backplane with its housing structure are formed by a plurality of parts, and wherein individual parts of the plurality of parts are allocated to at least one of the switching system, the internal side of the main distributor, and the external side of the main distributor.

* * * * *